Figure 1:
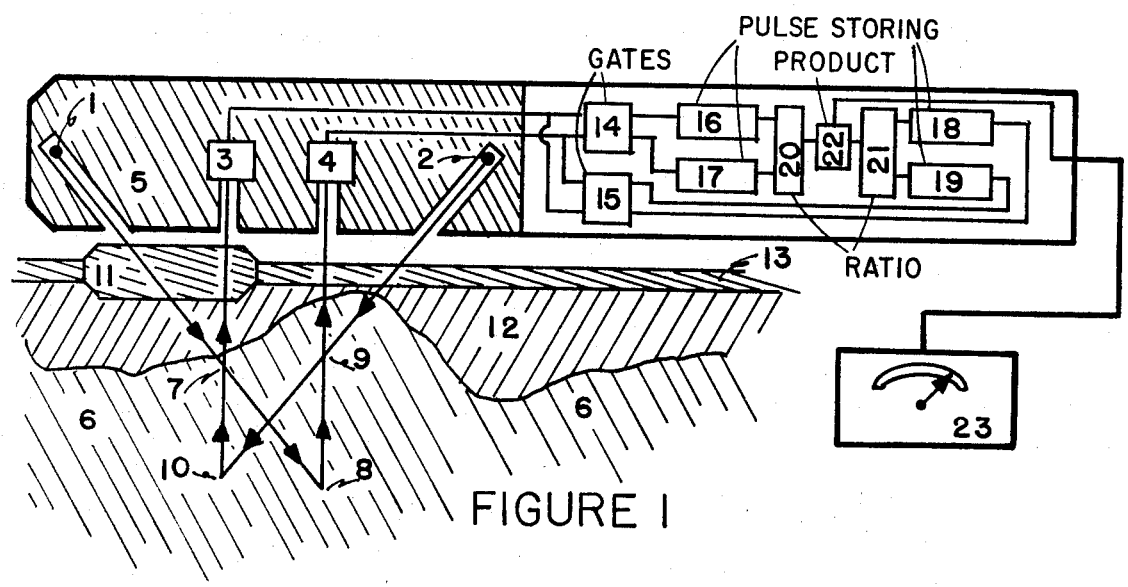

United States Patent [19]
Kehler

[11] 3,846,631
[45] Nov. 5, 1974

[54] GAMMA RAY DIFFERENTIAL DENSITY PROBE

[75] Inventor: Paul Kehler, South Bend, Ind.

[73] Assignee: Applied Invention Corporation, Mishawaka, Ind.

[22] Filed: Mar. 13, 1972

[21] Appl. No.: 224,238

[52] U.S. Cl................. 250/269, 250/253, 250/262
[51] Int. Cl............................................. G01v 5/00
[58] Field of Search.......... 250/83.6 S, 83.6 W, 253, 250/255, 269, 262

[56] References Cited
UNITED STATES PATENTS

| | | |
|---|---|---|
| 2,996,618 | 8/1961 | Goodman et al. ........ 250/83.6 W X |
| 3,038,075 | 6/1962 | Youmans .................. 250/83.6 W X |
| 3,240,938 | 3/1966 | Hall, Jr. .................... 250/83.6 W X |
| 3,566,117 | 2/1971 | Tixier........................ 250/83.6 W X |
| 3,567,935 | 3/1971 | Nagel......................... 250/83.6 W X |

*Primary Examiner*—Archie R. Borchelt

[57] ABSTRACT

A gamma ray density probe and method utilizing a pair of alternately operated gamma ray sources, and a pair of gamma ray detectors, said density probe being able to measure differentially the density at a predetermined distance from the probe, independent of the geometry of the sample and of the geometry and the chemical composition of interfering materials by computing the product of the ratio and the inverse ratio of two counting rates.

7 Claims, 8 Drawing Figures

PATENTED NOV 5 1974   3,846,631

GAMMA RAY DIFFERENTIAL DENSITY PROBE

This application is related to my copending application Ser. No. 207,040, filed Dec. 13, 1971 and to my prior U.S. Pat. No. 3,202,822.

Gamma ray density probes, in their most basic form, are devices incorporating a gamma ray source and a gamma ray detector, shielded from each other for prevention of counting by the detector of radiation that is emitted directly from the source towards the detector. During operation of the gauge, gamma rays (or photons) emitted from the source enter the material to be studied, and interact with the atomic electrons of the material by photoelectric absorption, Compton scattering, or (if the energy of the gamma radiation is high enough) by pair production. The photoelectric absorption process as well as the pair production process remove from the original gamma ray beam those particular photons that are involved in these reactions. In the Compton scattering process, on the other hand, the involved photon only loses some of its energy while changing its original direction of travel. The amount of energy lost by the photon is a function of the scattering angle.

Some of the photons emitted from the source into the sample are scattered towards the detector. Many of these never reach the detector, since their direction is changed by a second Compton scattering, or they are absorbed by the photoelectric absorption process or the pair production process. These scattered photons that reach the detector and interact with it, are counted by the electronic equipment associated with the detector.

Both the scattering in the material as well as the absorption of photons from the original and the scattered gamma ray beams, are functions of the electron density of the material which, in turn, can be interpreted in terms of the density of the material itself (in grams per centimeter). For short source-detector spacings, the scattering process dominates over the absorption process, and the counting rate of the detector increases with increasing density.

For long source-detector spacings, the absorption process dominates over the scattering process, and the counting rate of the detector decreases with increasing density of the sample.

The major difficulties encountered in conventional gamma ray density measurements are the definition of the sample size, the limited effective depth of sampling, and the disturbing effects of undesired, interfering materials located between the density probe and the sample. The chemical composition of the sample also effects the reading of conventional gamma ray density probes. These difficulties were reduced in recent designs of density probes, which incorporate one or more of the following features:

1. Collimation of the original and the scattered gamma ray beams for better geometrical definition of the size and location of the sampled volume.
2. Energy discrimination by the detector, selecting only singly scattered radiation and rejecting multiply scattered radiation, again for better definition of the size and location of the sampled volume.
3. Application of two detectors and ratio building electronic circuits, for the reduction of the effects of interfering materials.
4. Application of two alternately operating gamma ray sources, one detector and ratio building electronic circuits, again for the reduction of the effects of interfering materials.

One of the more advanced density probes disclosed to the public (U.S. Pat. No. 3,202,822) incorporates two gamma ray detectors, one collimated gamma ray source and ratio building electronic circuits, and is capable of precise measurement of the density of not directly accessible materials, as long as the interfering materials, located between the detectors of the probe and the sample, are identical in thickness and chemical composition at the location of both detectors. For example, in oil well logging applications, such a probe is capable of accurately measuring the density of earth formations through the iron casing of the well, as long as the thickness of the iron casing is constant and the wall of the well is smooth. However, non-uniformities in the wall of the well will interfere with the proper operation of the probe. Such non-uniformities can be caused by crooked holes, by cave-ins, and by variable thicknesses of the mudcake on the wall of the hole. In all of these situations, unknown and different amounts of materials are positioned between each of the two detectors and the sample volume of the formation to be studied.

Another advanced density probe (for which a patent application is copending), utilizes two collimated and alternately operating gamma ray sources, one gamma ray detector and ratio building electronic networks, and is also capable of measuring the density of materials at a predetermined depth. However, just as the two-detector probe, this two-source probe is still sensitive to interfering materials, if these materials are not identical in thickness and in chemical composition. The critical dimension of these two-source probes is the spacing between the sources. If the interfering materials are non-uniform over distances comparable to the spacing of the two sources, the measured density will be erroneous.

The present invention provides a method that is capable of precise measurement of the density of nonaccessible materials, regardless of the thickness and the chemical composition of materials that are located between the density probe and the sample. The depth of sampling of the present invention can be adjusted to the need of the experimenter and can be easily changed if desired. Generally speaking, the invention comprises the passing of two gamma ray beams from two intermittently operated gamma ray sources into the sample, receiving the radiation backscattered from each of the two sources by two separate detectors, and building ratios and products of the four separate counting rates in such a manner that the numerical result is an indication of the density of the sample.

Figure 2:
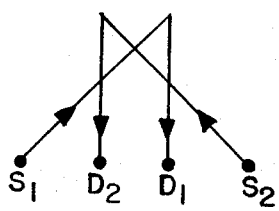
Figure 3:
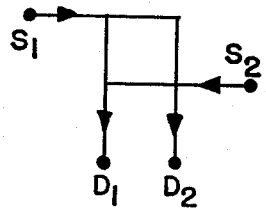
Figure 4:
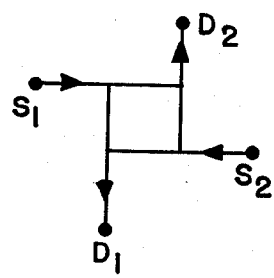
Figure 5:
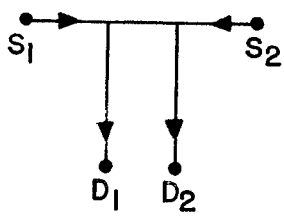
Figure 6:
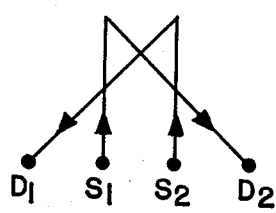
Figure 7:
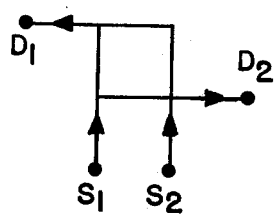
Figure 8:
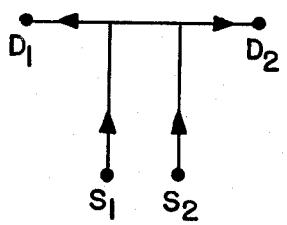

The novel features which I believe to be characteristic of this invention are set forth in the appended claims. The principles of the invention, however, are best understood from the following description of a specific embodiment of the invention, and in connection with the accompanying drawings, in which FIG. 1 is a diagrammatic presentation of the new density probe with a geometric configuration as could be used for well logging applications, FIG. 2 is the schematic presentation of the geometrical arrangement of the two gamma ray beams emitted by the two sources of FIG. 1, and of the two scattered gamma ray beams received by the two detectors of FIG. 1, FIG. 3 is the schematic presentation of the geometrical arrangement of the two emitted and the two scattered gamma ray beams of another embodiment of the invention, in which the two emitted beams are antiparallel and the two scattered beams are scattered under right angles from the emitted beams and are parallel to each other, FIG. 4 is the schematic presentation of the geometrical arrangement of the two emitted and the two scattered gamma ray beams of a third embodiment of the invention, in which the two emitted beams are antiparallel, and the two scattered beams are scattered under right angles from the emitted beams and are antiparallel to each other, FIG. 5 is the schematic presentation of the geometrical arrangement of the two emitted and the two scattered gamma ray beams of a fourth embodiment of the invention, in which the two emitted beams are antiparallel to each other and on one line, and the two scattered beams are scattered under right angles from two different points of the emitted beams and into arbitrary directions, FIG. 6 is the schematic presentation of the geometrical arrangement of the two emitted and the two scattered gamma ray beams of a fifth embodiment of the invention, in which the two emitted beams are parallel to each other and the scattered beams are scattered from the emitted beams at an angle that is different from a right angle, FIG. 7 is the schematic presentation of the geometrical arrangement of the two emitted and the two scattered gamma ray beams of a sixth embodiment of the invention, in which the emitted beams are parallel to each other, and the scattered beams are scattered under right angles to the emitted beams and are antiparallel, and FIG. 8 is the schematic presentation of the geometrical arrangement of the two emitted and the two scattered gamma ray beams of a seventh preferred embodiment of the invention, in which the scattered beams are antiparallel to each other and on one line, and the two emitted beams intersect the scattered beams under right angles and at two different points.

In the following description, reference will be made by using numerals which designate components and parts shown in FIG. 1. The schematics shown in the FIGS. 2, 3, 4, 5, 6, 7 and 8 are self explanatory and do not need to be referred to by numerals. In these Figures, the symbols $S_1$ and $S_2$ are used for the first and the second source, and $D_1$ and $D_2$ are used for the first and the second detector.

The characteristic components of the density probe shown in FIG. 1 are a first gamma ray source 1, a second gamma ray source 2, said second gamma ray source emitting gamma rays of preferably the same energy as the energy of the gamma rays emitted by said first gamma ray source, a first gamma ray detector 3, and a second gamma ray detector 4. Both gamma ray sources and both detectors are placed in a shield 5 which prevents gamma rays that are emitted from the sources to reach the detectors directly. Thus, only those gamma rays can reach the detectors 3 and 4 and that are scattered in the sample 6 at the locations 7 and 8 or 9 and 10. These points (where the gamma rays are scattered towards the detector) determine the depth of sampling of the density probe. For a properly designed probe, this depth of sampling is well defined. It will be shown in the following description that the density of materials above or below this depth of sampling does not interfere with the density measurement at the predetermined depth of sampling.

FIG. 1 shows the new density probe in an embodiment that is preferred for well logging applications. Both gamma ray sources 1 and 2 are collimated and emit well defined beams of gamma radiation into the sample 6 (an earth formation). In the following description, the gamma rays emitted into the sample by the source 1 will be referred to as the original gamma rays from source 1, and the gamma rays emitted by the source 2 will be referred to as the original gamma rays from source 2.

Before entering the sample 6, the original gamma rays from source 1 have to penetrate a collar of the casing 11 and the concrete liner of the well 12. Once in the sample 6, some of the original gamma rays from source 1 are scattered towards the first detector 3 at the location 7, and towards the second detector 4 at the location 8. The gamma rays that are scattered towards the first detector 3 will be referred to as the first scattered gamma rays from source 1, and the gamma rays that are scattered towards the second detector 4 will be referrred to as the second scattered gamma rays from source 1.

The original gamma rays from source 2 have to penetrate the casing 13 and the concrete liner of the well 12, before entering the sample 6. Once in the sample 6, the original from source 2 are scattered towards the second detector 4 at the location 9 and towards the first detector 3 at the location 10. The gamma rays that are scattered towards the first detector 3 will be referred to as the first scattered gamma rays from source 2, and the gamma rays that are scattered towards the second detector 4 will be referred to as the second scattered gamma rays from source 2.

The detectors 3 and 4 are also collimated and receive radiation from only one well defined direction, which is the sensitive axis of the detectors. The sensitive axis of the first detector 3 intersects the original gamma rays from source 1 at the location 7 and the original gamma rays from source 2 at the location 10. The sensitive axis of the second detector 4 intersects the original gamma rays from source 1 at the location 8 and the original gamma rays from source 2 at the location 9.

Some of the gamma rays scattered at the locations 7 and 10 towards the first detector 3 and at the locations 9 and 8 towards the second detector 4 will react with these detectors and will cause electrical pulses whose amplitudes are proportional to the energy of the incident gamma rays. These pulses are amplified by preamplifiers and amplifiers, and are fed to discriminators which are set to pass only those pulses that correspond to the energy of those gamma rays that were scattered at the location 7 and 10 towards the detector 3, and at the location 9 and 8 towards the detector 4. Gamma rays that underwent multiple scattering prior to entering the detectors 3 and 4, will be rejected by the discriminators. The output of the discriminators leads to the gates 14 and 15 which are synchronized with the two sources 1 and 2 which irradiate alternately the sample 6.

When source 1 is turned on (and source 2 is turned off), gate 14 is opened and gate 15 is closed. The open gate 14 allows passage of pulses from detector 3 into the pulse storing means 16, and passage of pulses from detector 4 into the pulse storing means 17.

When source 2 is turned on (and source 1 is turned off), gate 15 is opened and gate 14 is closed. The open gate 15 allows passage of pulses from detector 3 into the pulse storing means 18, and passage of pulses from detector 4 into the pulse storing means 19.

A ratio building device 20 computes the ratio of the number of pulses stored in the pulse storing means 16 to the number of pulses stored in the pulse storing means 17. A ratio building device 21 computes the ratio of the number of pulses stored in the pulse storing means 19 to the number of pulses stored in the pulse storing means 18. A product building means 22 computes the product of the two ratios derived by the ratio building means 20 and 21, and displays the result on the output meter 23.

The pulse storing means, not objects of this invention, can be digital memories that are cleared of old information at the beginning of each cycle of the sources and are loaded with new information during each cycle of operation of the density probe, or they can be counting rate metering devices that are capable of averaging the number of pulses admitted to the pulse storing means during several cycles of operation of the density probe.

The electronic circuits shown in FIG. 1 are not necessary for the functioning of the method, and therefore are not objects of the invention either. They are only shown in FIG. 1 to help in understanding the novel method employed by the embodiment of this Figure. In simple situations, when the tool is easily accessible and sufficient time is available, an accurate density measurement can be performed by using only one pulse storing means and by reading out manually and separately the counting rates of each of the two detectors at times when one or the other source is irradiating the sample. Those familiar with the art will design electronic circuits of sophistication sufficient for their needs. Also, instead of computing the product of two ratios, the ratio of two products can be computed to obtain the same results. Similarly, several ways to pulse the two sources are known to those familiar with the art. For example, rotary or linear shutters can be used, or a single source can alternately be positioned behind two different collimators. For this reason, the method of pulsing the two sources is not considered to be an object of this invention. The type of gamma ray sources is also not an object of the invention, since different types are preferred for different applications. Capsule type sources containing the radioactive isotopes cobalt 60 or cesium 137 are the types of gamma ray sources most frequently used in gamma ray density probes.

Now, let us denote with $N_1$ the total number of gamma rays that are carried towards the sample 6 by the beam of the original gamma rays from source 1 during that time of a cycle of the density probe in which the source 1 is turned on and source 2 is turned off, and let us denote with $N_2$ the total number of gamma rays that are carried towards the sample 6 by the original beam of gamma rays from source 2 during that time of a cycle of the density probe in which source 2 is turned on and source 1 is turned off.

At the location 7, the number $N_1$ will be reduced to $N_3$, $$N_3 = N_1 A_1$$

where $A_1$ = the beam of attenuation of the original gamma rays from source 1 on their path from source 1 to the location 7 (through the casing collar 11, the concrete liner 12, and a thickness of the sample 6).

At this location, a fraction $F_1$ of the gamma rays is scattered towards the detector 3, which means that the total number of gamma rays in the beam of the first scattered gamma rays from source 1, $N_4$ is $$N_4 = N_3 F_1 = N_1 A_1 F_1$$

On their passage from location 7 to the detector 3, the gamma rays will be attenuated by another factor, and the total number of gamma rays incident on the detector 3, $N_5$, is $$N_5 = N_4 A_2 = N_1 A_1 A_2 F_1$$

where $A_2$ = the beam of attenuation of the first scattered gamma rays from source 1 on their path from the location 7 to the detector 3 (through the casing collar 11, the concrete liner 12, and a thickness of the sample 6).

Due to the limited efficiency of the detector 3 and to the discriminating function of the discriminator, only a fraction $E_1$ of these gamma rays will be converted to electrical pulses, numbering $N_6$, that reach the gates 14 and 15, with $$N_6 = N_5 E_1 = N_1 A_1 A_2 F_1 E_1$$

It was mentioned before that, whenever source 1 is turned on, gate 14 is open. Therefore, the pulses from detector 3 will be stored, during this time, in the pulse storing means 16. Denoting this number of pulses with $I_{11}$ (the first subscript stands for the first source 1 and the second subscript stands for the first detector 3), the following information is stored in the pulse storing means 16:

$$I_{11} = N_6 = N_1 A_1 A_2 F_1 E_1$$

$F_1$ and $E_1$ are constants inherent in the design of the density probe, which do not change during even prolonged measurements. Therefore, they can be expressed by one constant $c_{11}$. With this substitution, the number of pulses stored in the pulse storing means 16 becomes $$I_{11} = N_1 A_1 A_2 c_{11}$$

1

When gate 14 is open, it also admits pulses to the pulse storing means 17, which stores the number of pulses $I_{12}$:

$$I_{12} = N_1 A_1 A_3 A_4 A_5 c_{12}$$

2 where $A_3$ = the beam of the attenuation of the original gamma rays from source 1 in their passage from the location 7 to the point 8, $A_4$ = the beam of the attenuation of the second scattered gamma rays from source 1 in their passage from the location 8 to the location 9, $A_5$ = the attenuation of the beam of the second scattered gamma rays from source 1 in their passage from the location 9 to the second detector 4 (through a thickness of the sample 6, the concrete liner 12 and the iron casing 13), and $c_{12}$ = a constant inherent in the design of the probe.

The ratio building means 20 builds the ratio $R_1$ of these two numbers of counts stored in the pulse storing means 16 and 17, with $$R_1 = N_1 A_1 A_2 c_{11}/N_1 A_1 A_3 A_4 A_5 c_{12}$$

When expressing the ratio of the two constants $c_{11}$ and $c_{12}$ by another constant $c_1$, the equation for $R_1$ reads:

$$R_1 = c_1 (1/A_3 A_4)(A_2/A_5) \qquad 3$$

In this equation, $c_1$ is determined by constant properties of the density probe, $A_3$ and $A_4$ are indicative of the density of the sample 6, and $A_2$ and $A_5$ are depending on the thickness and the composition of the interfering layers which, in FIG. 1, are the casing collar 11, the casing 13, two different thicknesses of the concrete layer 12, and two different thicknesses of the sample 6.

As soon as the first source 1 is turned off and the second source 2 is turned on, the gate 14 closes and the gate 15 opens. Under this condition, pulses from the first detector 3 are stored in the pulse storing means 18 and pulses from the detector 4 are stored in the pulse storing means 19.

Using symbols corresponding to those shown in Equation 1, the number of counts stored in the pulse storing means 19, $I_{22}$, is $$I_{22} = N_2 A_6 A_7 c_{22}$$

where $N_2$ = the total number of gamma rays that are carried towards the beam of the sample 6 by the original gamma rays from source 2 during that time of a cycle of the density probe in which source 2 is turned on and source 1 is turned off, $A_6$ = the attenuation of the beam of the original gamma rays from source 2 during their passage from source 2 to the point 9 (through the casing 13, the concrete liner 12 and a thickness of the sample 6), $A_7$ = the attenuation of the beam of the second scattered gamma rays of source 2 during their passage from point 9 to the second detector 4 (through a thickness of the sample 6, the concrete liner 12 and the casing 13), and $c_{22}$ = a constant inherent in the design of the probe.

Since the energy of the gamma rays in the beam of the second scattered gamma rays from source 2 is identical to the energy of the gamma rays in the beam of the second scattered gamma rays from source 1, and since both these beams of scattered gamma rays travel on identical paths when going from location 9 to the second detector 4, their attenuation along this path is identical, i.e., $A_5 = A_7$. Substitution of $A_7$ by $A_5$ in the last equation leads to $$I_{22} = N_2 A_5 A_6 c_{22} \qquad 4$$

The pulse storing means 18 is storing these pulses that are passed by the gate 15 from detector 3 at a time when source 2 is turned on and source 1 is turned off. Using symbols corresponding to those used in Equation 2, the number of pulses stored in this pulse storing means, $I_{21}$, is $$I_{21} = N_2 A_6 A_8 A_9 A_{10} c_{21}$$

where $A_8$ = the attenuation of the beam of the original gamma rays from source 2 during their passage from the location 9 to the point 10, $A_9$ = the attenuation of the beam of the first scattered gamma rays from source 2 during their passage from the location 10 to the location 7, $A_{10}$ = the attenuation of the beam of the first scattered gamma rays from source 2 during their passage from the location 7 to the first detector 3 (through a thickness of the sample 6, the concrete liner 12 and the collar of the casing 13), and $c_{21}$ = a constant inherent in the design of the probe.

It was shown in the derivation of Equation 4 that $A_7$ is equal to $A_5$. For the same reasons as mentioned there, $A_{10}$ is also equal to $A_2$. Substitution of $A_{10}$ by $A_2$ in the last equation leads to $$A_{21} = N_2 A_2 A_6 A_8 A_9 c_{21} \qquad 5$$

The ratio building means 21 computes the ratio $R_2$ of the number of pulses shown in the equations 4 and 5:

$$R_2 = I_{22}/I_{21} = N_2 A_5 A_6 c_{22}/N_2 A_2 A_6 A_8 A_9 c_{21}$$

When expressing the ratio of the two constants $c_{22}$ and $c_{21}$ by another constant $c_2$, the equation for $R_2$ reads:

$$R_2 = c_2 (1/A_8 A_9)(A_5/A_2). \qquad 6$$

The product building means 22 computes the product $P$ of the two ratios computed by the ratio building means 20 (Equation 3) and the ratio building means 21 (Equation 6):

$$P = R_1 R_2 = c_1[(1/A_3 A_4)(A_2/A_5)]c_2[(1/A_8 A_9)(A_5/A_2)].$$

When expressing the product of the constants $c_1$ and $c_2$ by another constant $c$, the equation for $P$ reads:

$$P = c(1/A_3 A_4 A_8 A_9) \qquad 7$$

Now, all four of the attenuation coefficients occuring in Equation 7 apply to gamma ray beams that are located entirely within the sample 6, between the locations 7, 8, 9 and 10. The volume between these four locations is the sampling volume of which the density is measured by the probe shown in FIG. 1. The thickness and the chemical composition of the collar 11, the casing 13, the concrete liner 12, or of those portions of the formation that are located above the locations 7 and 9, do not effect the product P at all. The probe shown in FIG. 1, therefore, is a true differential density probe, i.e., a probe capable of measuring differentially the density at a predetermined distance from the probe, and independent of the thickness and the chemical composition of any interfering layers.

The preferred embodiment shown in FIG. 1 is only one possible arrangement of two pulsed sources and two detectors for the measurement of the density of inaccessible samples. The embodiment shown in FIG. 1 is characterized by the fact that the scattered gamma rays are reaching the two detectors on parallel paths, and that they intersect with the beams of the original gamma rays at angles that are different from right angles. The geometry of the beams of the original and the scattered gamma rays of the embodiment shown in FIG. 1 is also shown, schematically, in FIG. 2. Such a linear arrangement of source and detector pairs is advantageous when the sample to be measured is accessible from only one side.

The same objective, i.e., measurement of the density of a sample that is accessible from only one side, is also reached by a geometrical arrangement of the source and the detector pairs as shown in FIG. 6. In this Figure, the pair of sources is straddled by the two detectors. The beams of gamma rays emitted by the two sources are parallel, and the scattered beams are scattered from the emitted beams under an acute angle. The geometrical arrangement of the sources and the detectors of the preferred embodiment of the invention shown in FIG. 6 is similar to the geometrical arrangement shown in FIG. 2, except that the positions of the emitted and the scattered beams are reversed in these two Figures.

In some situations, for example when the density of a core or a small rock has to be measured in a laboratory, the sample is accessible from four directions. For problems of such nature, compact differential density guages can be built that have a geometrical arrangement of the source and the detector pairs as shown in FIG. 4. In the geometrical arrangement of the embodiment of the invention shown schematically in this Figure, the two emitted beams are antiparallel and the two scattered beams are scattered under right angles from the emitted beams and are also antiparallel.

If the accessibility is limited (or desired) to only three sides of the sample, differential density probes can be designed with geometrical arrangements of the source and detector pairs as shown in the FIGS. 3 and 7. The embodiments of the invention shown in the FIGS. 3 and 7 are related to each other since the emitted and the scattered beams form the same geometrical pattern. However, the relative positions of the scattered and of the emitted beams are reversed in these two Figures: FIG. 3 shows schematically the geometrical arrangement of an embodiment of the invention in which the two emitted beams are antiparallel and the two scattered beams are scattered under right angles from the emitted beams and are parallel. The FIG. 7, on the other hand, shows schematically the geometrical arrangement of the sources and the detectors of an embodiment of the invention in which the two emitted beams are parallel and the two scattered beams are scattered under right angles from the emitted beams and are antiparallel.

In some special situations, for example when a measurement of the density is desired on cylindrical cores that have a very small diameter, the geometrical patterns defined by the emitted and the scattered beams of the embodiments of the invention shown in the FIGS. 2, 3, 4, 6 and 7 will not fit into the sample. In such cases, a measurement of the density can still be accurately performed by the new differential density probe, if either the emitted beams or the scattered beams are placed parallel to the centerline of the core, as shown in the FIGS. 5 and 8. The FIG. 5 shows schematically the geometrical arrangement of an embodiment of the invention in which the two emitted beams are antiparallel and on one line, and the scattered beams are scattered under right angles from two different points of the emitted beams and into arbitrary directions. The FIG. 8 shows schematically the geometrical arrangement of an embodiment of the invention in which the two scattered beams are antiparallel and on one line, and the two emitted beams intersect the scattered beams under right angles and at two different locations. It can be easily recognized that the relative positions of the two scattered and the two emitted beams are reversed in the FIGS. 5 and 8.

For all the geometrical arrangements of the scattered and the emitted beams shown in the FIGS. 3, 4, 5, 6, 7 and 8, ratio and product building techniques similar to those described in connection with the FIGS. 1 and 2 will eliminate the effects of all materials that are located outside of the volume that is determined by the locations of intersect of the emitted and scattered beams of gamma rays. All the illustrated embodiments of the invention, therefore, will measure precisely the density of materials located at a predetermined position relative to the probe. Various other alterations in the details of construction and the sequence of computations can be made without departing from the scope of the invention, which is indicated in the appended claims.

I claim:

1. A gamma ray density probe utilizing a first collimated gamma ray source, a second collimated gamma ray source, a first collimated gamma ray detector and a second collimated gamma ray detector, wherein said first and said second collimated gamma ray sources are located on two parallel planes placed at a distance from each other, with said first gamma ray source emitting gamma rays into a sample to be measured along at least one trajectory within the first of said two parallel planes and said second collimated gamma ray source emitting gamma rays into said sample along at least one trajectory within the second of said two parallel planes, with some of the gamma rays emitted by said first collimated gamma ray source being scattered under a geometrically predetermined scattering angle towards said second collimated gamma ray detector at a first location in said sample and along at least one trajectory that is intersecting said second of said two parallel planes at a second location in said sample, with some of the gamma rays emitted by said second collimated gamma ray source being scattered under said geometrically predetermined angle towards said first collimated gamma ray detector at a third location in said sample and along at least one trajectory that is intersecting said first of said two parallel planes at a fourth location in said sample, with some of the gamma rays emitted by said first collimated gamma ray source being scattered under said geometrically predetermined scattering angle towards said first collimated gamma ray detector at said fourth location in said sample and with some of the gamma rays emitted by said second collimated gamma ray source being scattered under said geometrically predetermined scattering angle towards said second collimated gamma ray detector at said second location in said sample, wherein a ratio is computed by dividing the counting rate of said first collimated gamma ray detector which is caused by gamma rays scattered from said fourth location by the counting rate of said second collimated gamma ray detector which is caused by gamma rays scattered from said first location, wherein an inverse ratio is computed by dividing the counting rate of said second collimated gamma ray detector which is caused by gamma rays scattered from said second location by the counting rate of said first collimated gamma ray detector which is caused by gamma rays scattered from said third location, and wherein a product of said ratio and said inverse ratio is formed and displayed in a manner that allows interpretation of this product in terms of the average density of that volume of said sample that is located between said four locations in said sample.

2. A gamma ray density probe utilizing two collimated gamma ray sources and two collimated gamma ray detectors, wherein the first and second collimated gamma ray detectors are located in two parallel planes placed at a distance from each other, with said first collimated gamma ray detector receiving scattered radiation from a sample to be measured along at least one trajectory within the first parallel plane and said second collimated gamma ray detector receiving scattered radiation from said sample along at least one trajectory within the second parallel plane, wherein some of the gamma rays emitted from the second collimated gamma ray source along at least one trajectory are scattered towards said first collimated gamma ray detector at a first location in said sample under a geometrically predetermined angle and along trajectories that pass through a fourth location in said sample, wherein some of the gamma rays emitted from said second collimated gamma ray source along at least one trajectory are scattered towards the second gamma ray detector at a second location in said sample, wherein some of the gamma rays emitted from the first collimated gamma ray source along at least one trajectory are scattered towards said second collimated gamma ray detector at a third location in said sample under the same said geometrically predetermined angle and along trajectories that pass through said second location in said sample, wherein some of the gamma rays emitted from said first collimated gamma ray source along at least one trajectory are scattered towards said first collimated gamma ray detector at said fourth location in said sample, wherein a ratio is computed by dividing the counting rate of said first collimated gamma ray detector which is caused by gamma rays scattered from said fourth location by the counting rate of said second collimated gamma ray detector which is caused by gamma rays scattered from said third location, wherein an inverse ratio is computed by dividing the counting rate of said second collimated gamma ray detector which is caused by gamma rays scattered from said second locations by the counting rate of said first collimated gamma ray detector which is caused by gamma rays scattered from said first location, and wherein a product of said ratio and said inverse ratio is formed and displayed in a manner that allows interpretation of this product in terms of the average density of that volume of said sample that is located between said four locations in said sample.

3. A method for determining the density of a sample from the product of the ratio and the inverse ratio of the counting rates of a first collimated gamma ray detector and a second collimated gamma ray detector, said ratio being derived by dividing the counting rate of said first collimated gamma ray detector by the counting rate of said second collimated gamma ray detector during a time when a first collimated gamma ray source is and a second collimated gamma ray source is not irradiating said sample, and said inverse ratio being derived by dividing the counting rate of said second collimated gamma ray detector by the counting rate of said first collimated gamma ray detector during a time when said second collimated gamma ray source is and said first collimated gamma ray source is not irradiating said sample.

4. The method for determining the density of a sample according to claim 3, wherein the collimator of said first collimated gamma ray detector allows only that singly scattered gamma radiation to enter said first collimated gamma ray detector which has been emitted by said first collimated gamma ray source or said second collimated gamma ray source into said sample and is scattered at geometrically predetermined locations and under geometrically predetermined scattering angles toward said first collimated gamma ray detector, and wherein the collimator of said second collimated gamma ray detector allows only that singly scattered gamma radiation to enter said second collimated gamma ray detector which has been emitted by said first collimated gamma ray source or said second collimated gamma ray source into said sample and is scattered from within said sample toward said second collimated gamma ray detector at geometrically predetermined locations and under the same said geometrically predetermined scattering angle.

5. The method for determining the density of a sample according to claim 4, wherein said first collimated gamma ray detector and said second collimated gamma ray detector are feeding pulses to energy discriminators, said energy discriminators allowing passage of signals that are due to gamma rays that are scattered only once and under said geometrically predetermined scattering angle, and discriminating against gamma rays that are scattered more than once or that are scattered once but at locations different from said geometrically predetermined locations in said sample, wherein only the signals passed by said energy discriminators are contributing to said counting rate of said first collimated gamma ray detector and said counting rate of said second collimated gamma ray detector, said counting rates of said first and said second collimated gamma ray detectors being used for the computation of said ratio and said inverse ratio, and wherein said product of said ratio and said inverse ratio are independent of the presence of any interfering materials that may be positioned between said sample and said first collimated gamma ray source, said second collimated gamma ray source, said first collimated gamma ray detector or said second collimated gamma ray detector.

6. An oil well density logging tool according to claim 1, wherein said first collimated gamma ray detector, said second collimated gamma ray detector, said first collimated gamma ray source and said second collimated gamma ray source are located within one elongated cylindrical housing and on one common line, said common line being perpendicular to said two parallel planes on which said first collimated gamma ray source and said second collimated gamma ray source are respectively located.

7. An oil well density logging tool according to claim 2, wherein said first collimated gamma ray detector, said second collimated gamma ray detector, said first collimated gamma ray source and said second collimated gamma ray source are located within one elongated cylindrical housing and on one common line, said common line being perpendicular to said two parallel planes on which said first collimated gamma ray detector and said second collimated gamma ray detector are respectively located.

* * * * *